US007265558B1

(12) United States Patent
Penndal et al.

(10) Patent No.: US 7,265,558 B1
(45) Date of Patent: Sep. 4, 2007

(54) RADAR LEVEL GAUGE USING ELLIPTICALLY OR CIRCULARLY POLARIZED WAVES

(75) Inventors: Niklas Penndal, Jönköping (SE); Anders Jirskog, Huskvarna (SE); Olov Edvardsson, Linköping (SE)

(73) Assignee: Rosemount Tank Radar AB, Goteborg (SE)

( * ) Notice: Subject to any disclaimer, the term of this patent is extended or adjusted under 35 U.S.C. 154(b) by 0 days.

(21) Appl. No.: 11/543,451

(22) Filed: Oct. 5, 2006

(51) Int. Cl.
*G01R 27/04* (2006.01)
(52) U.S. Cl. ........................ 324/637; 324/644; 342/124
(58) Field of Classification Search ................ 324/637, 324/644; 342/124
See application file for complete search history.

(56) References Cited

U.S. PATENT DOCUMENTS

| | | | |
|---|---|---|---|
| 5,543,720 A | 8/1996 | Edvardsson | 324/643 |
| 6,759,976 B1 * | 7/2004 | Edvardsson | 342/124 |
| 6,987,481 B2 | 1/2006 | Fehrenbach et al. | 342/124 |

* cited by examiner

*Primary Examiner*—Walter Benson
(74) *Attorney, Agent, or Firm*—Westman, Champlin & Kelly, P.A.

(57) ABSTRACT

A radar level gauge (RLG) is provided for determining a filling level of a filling material contained in a container by transmitting and receiving elliptically or circularly polarized waves. The RLG comprises: a feeding circuitry for feeding and receiving two essentially orthogonal elliptically polarized waveguide modes, one of the modes for transmission and another mode for reception; an antenna for transmitting the waveguide modes towards the filling material and for receiving reflected signals; and a waveguide to provide signals between said feeding circuitry and the antenna. Further, the feeding circuitry comprises: a microwave generating unit (TX); a microwave receiving unit (RX); at least three feeding probes being at least partly exposed to the interior of the waveguide; and a coupling circuitry for transferring and feeding signals between each feeding probe and the microwave generating unit and/or the microwave receiving unit. At least the coupling circuitry and the feeding probes are implemented on a common printed circuit board (PCB), and the printed circuit board is arranged transversely over the waveguide.

16 Claims, 3 Drawing Sheets

RADAR LEVEL GAUGE USING ELLIPTICALLY OR CIRCULARLY POLARIZED WAVES

FIELD OF THE INVENTION

The present invention relates to a radar level gauge for improved radar level gauging of a filling level of filling material in a vessel and in particular to a radar filling level measuring device capable of generating and receiving an elliptically polarized wave or, as a special case, a circularly polarized wave.

BACKGROUND OF THE INVENTION

Radar level gauges are commonly used for the continuous determination of filling levels of filling materials, such as liquids or bulk materials, in container, such as a tank or other vessels. In such measurement systems, the filling level is determined based on a delay or time difference between a signal transmitted towards the surface of the filling material, and a received signal reflected from said surface. For the determination of the desired wave delay, there are various radar principles. One of these is the impulse delay method (pulse radar method), another is the frequency modulated continuous wave (FMCW) radar method. In the FMCW radar method, the delay is determined in an indirect manner by transmitting a frequency modulated signal and creating a difference between the transmitted and the received momentary frequency. The pulse radar method, on the other hand, uses the radiation of short microwave pulses, also known as bursts, wherein the direct time duration is determined between the transmission and the reception of the individual pulses.

When using a single antenna for both transmitting and receiving, it is necessary to separate the electrical transmitting signals sent from the microwave generator to the antenna and the receiving signals sent back from the antenna to the microwave receiver. Most radar systems include a transmitter (TX), a receiver (RX) including signal processing, an antenna and a RX/TX-coupler enabling RX and TX to share the antenna. The RX/TX-coupler can take many forms, such as a circulator, fast switch, lossy power divider, etc. Most radar level gauges today use a lossy power divider, which gives a simple design at the expense of 8-12 dB degraded sensitivity.

One approach for realizing a transmitting/receiving antenna is the use of an elliptically polarized wave or, as a special case, a circularly polarized wave, instead of a linearly polarized wave. With an elliptically polarized wave, the electromagnetic field intensity vector spirals along the propagation direction in a helix with an elliptical cross section, whereby the field intensity vector results from superimposing two wave components having different amplitudes. In the special case of a circularly polarized wave, the electromagnetic field intensity vector also spirals along the propagation direction. The spiral, however, has a circular cross section and the two wave components combining to form the resulting wave have equal amplitudes. Depending on the sense of rotation of the spiraling, a distinction can be made between clockwise and anticlockwise (i.e., counter-clockwise) circular polarization, generally referred to as RHCP (right hand circular polarization) and LHCP (left hand circular polarization). RHCP/LHCP are orthogonal, approximately independent, in the same sense as two linear polarizations which are perpendicular (horizontal/vertical, etc), and as is known for those verse in the art, any mixture of linear and circular polarizations are known as elliptical for which pairs of orthogonal polarizations can be chosen.

Use of elliptic/circular polarization for radar level gauging is very useful for two reasons. First, such polarized waves change their rotation during reflection, so that a twice reflected wave has a rotation opposite to that of a once reflected wave. Thus, sensors can distinguish between various reflection components and may suppress undesirable components such as those deflected by the vessel wall. Furthermore, the use of the elliptic/circular polarization may be useful for the determination of the filling level of a bulk material in a vessel when the bulk material has an irregular and fissured surface, e.g. due to turbulence. Depending on the use, an even more important property of the use of two orthogonal polarizations, such as two counter-rotating circular polarizations, is that it allows two antenna functions to be combined in one physical antenna structure while maintaining a certain insulation between the two antenna functions. The dual antenna functions is a way to avoid the lossy power divider of a TX/RX-coupler and thus a way to gain at least 6 dB, but in practice 8-12 dB, in a two way power budget.

Radar level gauges using elliptically/circularly polarized waves are previously known, e.g. by U.S. Pat. No. 5,543,720 and U.S. Pat. No. 6,987,481.

The radar level gauge disclosed in U.S. Pat. No. 5,543,720 is related to a solution where a dielectric disc is inserted within a hollow waveguide in order to generate circularly polarized waves. However, this solution has some practical drawbacks, such as being rather expensive and requiring considerable space. Furthermore, this known solution has relatively high losses and a relatively low bandwidth is provided.

The radar level gauge disclosed in U.S. Pat. No. 6,987,481 comprises two feeding probes arranged in a waveguide, and fed by a directional coupler, having e.g. a 90 degree hybrid coupler for phase separation of the signals. The feeding probes and the directional coupler may be arranged on a printed circuit board, and be arranged in the hollow waveguide. However, this known system is also subject to severe losses, and in particular leakage between the transmitting and receiving probes, whereby the bandwidth becomes relatively low.

There is therefore still a need for a radar level gauge for using elliptically or circularly polarized waves, and where the above-discussed drawbacks in terms of bandwidth, cost and power losses may be eliminated or alleviated.

SUMMARY OF THE INVENTION

It is therefore an object of the present invention to provide an improved radar level gauge which eliminates or at least alleviates the above-discussed problems of the prior art.

This object is achieved with a radar level gauge in accordance with the appended claims.

According to the present invention, there is provided a radar level gauge (RLG) for determining a filling level of a filling material contained in a container by transmitting and receiving elliptically polarized waves. The RLG comprises: a feeding circuitry for feeding and receiving two essentially orthogonal elliptically polarized waveguide modes, one of the modes for transmission and another mode for reception; an antenna for transmitting the waveguide modes towards the filling material and for receiving signals reflected from the filling material; and a waveguide to provide signals between said feeding circuitry and the antenna. Further, the feeding circuitry comprises: a microwave generating unit (TX); a microwave receiving unit (RX); at least three feeding probes at least partly protruding into the waveguide for transmitting and receiving the two essentially orthogonal elliptically polarized waveguide modes; and a coupling circuitry for transferring and feeding signals between each feeding probe and the microwave generating unit and/or the microwave receiving unit.

The essentially orthogonal waveguide modes implies that the polarizations are chosen to allow two propagating waves in the waveguide and in the antenna to exist and propagate in opposite directions essentially without interfering with each other. To this end, the waveguide have certain symmetry properties (such as circular) to allow two orthogonal propagation modes to exist together without interference with each other. In practical realizations the two propagation modes need not be orthogonal in the mathematical sense, but the unwanted power coupling may anyway be neglected.

This RLG allows an efficient use of elliptically polarized waves, which are per se very useful, for many type of RLG applications, and especially when the tank offers a difficult measuring environment, where there is much turbulence on the surface of the filling material, etc. In particular waves with circular polarization can be used. RX/TX separation by elliptical/circular polarization will normally increase sensitivity quantified as a factor of at least 2 in terms of distance or usable antenna diameter in sensitivity limited cases (turbulence, foam, etc) of use.

Further, it has surprisingly been found by the present inventors that the use of at least three separated feeding probes for transmission and reception of signals in the antenna makes it possible to significantly decrease the leakage between the transmitting feeding probes and the receiving feeding probes, and thus bandwidth and match can be optimized with minor regard to leakage, which constitutes a significant improvement compared to prior art solutions.

At least the coupling circuitry and the feeding probes are preferably implemented on a common printed circuit board (PCB), and the printed circuit board is arranged transversely across the waveguide. As long as the probes and coupling circuits are located on the same PCB the additional manufacturing cost for extra probes is insignificant. Preferably, the microwave generating unit (TX) and the microwave receiving unit (RX) are also implemented on the common printed circuit board (PCB). However, alternatively a piece of flexible card or molded plastic part with metallic conductors, sometimes referred to as "3D PCB", could be used to connect an ordinary PCB comprising the circuits with the waveguide.

As known by those skilled in the art, there are a great number of possible hybrid circuits to accomplish 90° and 180° phase shift, and by a sufficient number of quarter-wave sections, more or less any phase-split accuracy over a typical bandwidth can be met at the expense of space on the PCB and loss in the corresponding accumulated line lengths. However, in a practical circuit the space and possible losses are strictly limited and the 8-12% bandwidth (3 dB) available in the simplest hybrid circuits are a clear limitation for the typical radar level gauging systems using 10-15% bandwidth, preferably at a better accuracy than the 3 dB. The mechanical symmetry introduced by this invention will increase the bandwidth by 30-60%, which with regard to the absence of margins, is a significant practical improvement.

Still further, one additional advantage with three, and especially four, probes is that the generation of the $E_{01}$ waveguide mode is decreased substantially. Even if the $E_{01}$ mode is cut-off it is known to generate disturbing resonances as it is never far from cut-off.

According to one line of embodiment, the feeding circuitry comprises three probes, two of which are geometrically separated by about 180 degrees, and the third being arranged essentially symmetrically there between. In this embodiment, the coupling circuitry is preferably arranged to feed transmitting signals of an operating frequency to the two probes geometrically separated by about 180 degrees in anti-phase, and to receive reflected signals from the intermediate third feeding probe. Further, the coupling circuitry preferably comprises a 180 degree coupler being connected to the two probes which are separated by about 180 degrees, and a 90 degree coupler having four terminals, said terminals being connected to the 180 degree coupler, the third feeding probe, RX and TX.

According to another line of embodiments, the feeding circuitry comprises at least four probes, said probes being essentially symmetrically arranged around the waveguide. In these embodiments, the coupling circuit is preferably arranged to feed the feeding probes to be used for transmission in progressive phase around the waveguide in clockwise and/or counter-clockwise order.

Here, at least two of the feeding probes may be usable for transmission and at least two feeding probes be usable for reception, wherein the feeding probes usable for transmission are symmetrically distributed around the waveguide, and the feeding probes usable for reception are arranged intermediately between said feeding probes usable for transmission. Alternatively, at least two of the feeding probes can be usable for transmission and at least two feeding probes be usable for reception, wherein the feeding probes usable for transmission are arranged adjacent to each other at one part of the waveguide and the feeding probes usable for reception are arranged adjacent to each other at another part of waveguide.

The parts of the feeding probes protruding into the waveguide preferably comprises essentially straight conducting elements, which are further preferably directed towards the center of said waveguide.

According to another aspect of said invention, there is provided a method for determining a filling level of a filling material contained in a container by transmitting and receiving elliptically polarized waves, comprising the steps:

providing at least three feeding probes which at least partly protrude into a waveguide;

operating said feeding probes to transmit a first elliptically polarized waveguide mode towards the filling material; and operating said feeding probes to receive a second elliptically polarized waveguide mode after reflection by said filling material, wherein said second elliptically polarized waveguide mode is essentially orthogonal to said first elliptically polarized waveguide mode.

In accordance with this aspect of the invention, similar advantages may be obtained as discussed above in relation to the first aspect of the invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
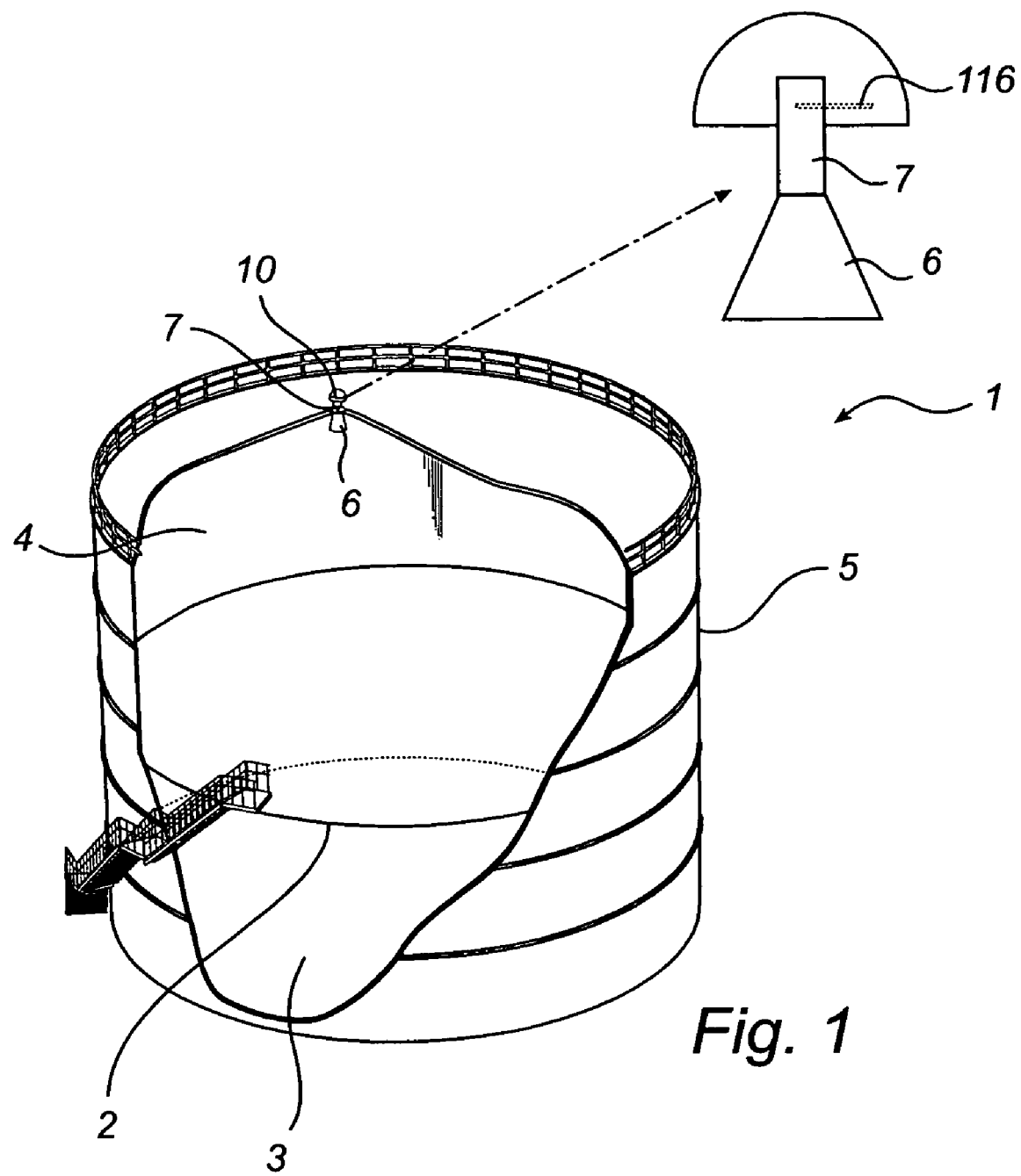
FIG. 1 is a schematic cross-sectional side view of a container, in which an antenna device according to the embodiment is arranged.

FIG. 1 shows schematically a microwave circuit arrangement for a radar level gauge system 1 in accordance with the invention. The system is usable to perform measurements of a filling level in a tank or container 5, i.e. to determine the level of an interface 2 between two materials 3, 4 such as between a filling material 3 stored in the tank and ambient air 4. The tank 5 may be stationary or arranged on a moving vehicle, such as on a tanker.

In an exemplary embodiment, the system in FIG. 1 comprises a microwave circuit arrangement 10 for transmitting and receiving radar signals and processing the received signals, whereby said signals may be used for determining the level in the tank. The microwave circuit arrangement 10 is connected to an antenna 6 through a waveguide 7, and controlled to transmit electromagnetic signals to the tank 5 and receive reflected signals. The antenna 6 and waveguide 7 may be of many different types, as is per se well known in the art. The system may use pulsed or continuously emitted radiation. In case pulsed signals are used, the signals can be a pulsed RF carrier at around a suitable frequency such as 6 or 26 GHz, with a length of about 2 ns or less, with a pulse repetition frequency in the order of MHz, at average power levels in the nW or µW area.

The received signals can be processed by a processor with software for analyzing the signals in order to determine the filling level in the tank, i.e. the level of the surface 2. The processor is preferably a microprocessor based circuit adapted to receive the incoming signal, as discussed above, and provide as an output a signal or information indicative of the level of material 3. The functions and algorithms implemented by said signal processor, some of which can be embodied in hardware and some of which can be embodied in software, are per se known from the art will not be discussed further in this application.

Some different embodiments of the microwave circuit arrangement will now be discussed in greater detail, with reference to FIGS. 2-5.

Figure 2:
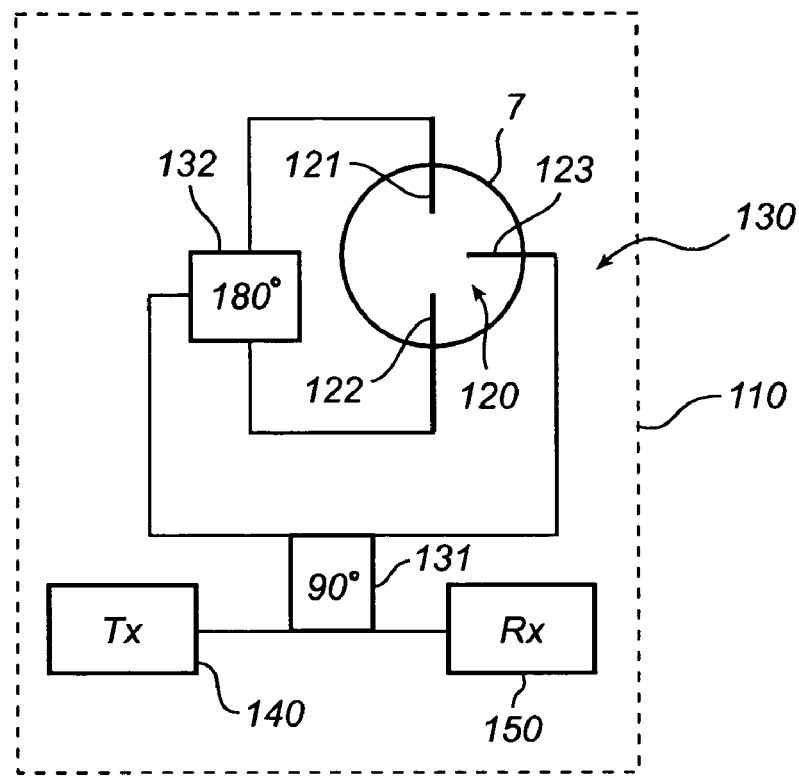
FIG. 2 is a schematic diagram of a first embodiment of a microwave circuit arrangement to be used in the radar level gauge system of FIG. 1.

According to a first embodiment, as is illustrated in FIG. 2, the entire microwave circuit arrangement is arranged on a single printed circuit board (PCB) 110. The microwave circuit arrangement comprises feeding probes 120, to be arranged in the waveguide 7 or the antenna 6, a microwave generating unit 140, or a corresponding microwave input port to be connected to a microwave generating unit, a microwave receiving unit 150, or a corresponding output port to be connected to a microwave receiving unit, and a coupling circuitry 130 for transferring and feeding signals between the microwave generating unit and the feeding probes, and between the microwave receiving unit and the feeding probes, respectively.

The microwave generating unit 140, generally referred to as transmitting unit (TX), is adapted to generate a microwave signal to be used for pulsed radar level measurement or FMCW, as is per se well known in the art. The microwave generating unit 140 may be implemented on the PCB 110. However, as an alternative a microwave input port may be arranged on the PCB, to be connected to an external microwave generating unit 140.

The microwave receiving unit 150, generally referred to as receiving unit (RX), is adapted to receive and process wave signals radiated by the antenna 6 and reflected by the surface of the filling material. The microwave receiving unit 150 can e.g. include circuits to carry out amplification, frequency conversion, filtering, demodulation or signal compression, as is per se well known in the art.

In FIG. 2 the waveguide conductor 7 is shown in a cross-sectional view. The PCB 110 extends through said waveguide conductor in such a way that the feeding probes 120, which are arranged on said PCB, protrudes into the waveguide conductor, thereby exposing the feeding probes to the interior of the waveguide conductor 7 and/or the antenna 6. The waveguide conductor 7 is preferably a hollow conductor with an inner surface having an essentially circular cross-section. The feeding probes 121-123 are fed by output microwave signals from the microwave generating unit 140 through the coupling circuitry 130 to transmit elliptically polarized waves, and preferably circularly polarized waves, towards the interior of the tank, and received microwave signals reflected from the interior of the tank are forwarded through the coupling circuitry 130 to the microwave receiving unit 150.

The integration of the PCB in the antenna assembly may be performed in various ways, which are per se well known. For example, the integration of the PCB may be accomplished in the way discussed in application US 2005/083228 by the same applicant, said document hereby being incorporated by reference. Preferably, the circuit board is arranged perpendicular to said waveguide.

According to the first embodiment, three feeding probes 121-123 are provided in the waveguide. Two of these feeding probes 121, 122 are arranged oppositely to each other, i.e. radially displaced with about 180 degrees. The third feeding probe 123 is arranged essentially symmetrically between the first and second feeding probe 121, 122, i.e. radially displaced with about 90 degrees from each of them.

Further, the coupling circuit 130 according to the first embodiment comprises a 90 degree coupler 131 having four terminals. One of the terminals is connected to TX 140, another to RX 150, a third to the feeding probe 123, and a fourth to a 180 degree coupler 132. The 180 degree coupler 132 has three terminals, of which one is connected to the 90 degree coupler 131, one to the feeding probe 121 and one to the feeding probe 122. The 90 and 180 degree couplers are known as hybrid ring couplers. For example, the 90 degree coupler preferably has a square configuration, each having the length of a quarter of the wavelength ($\lambda/4$). Due to these differing path lengths between the terminals the signal components are provided with a delay difference of $\lambda/4$, or 90 degrees. Such components are per se well known in the art, and the operation of these components are e.g. discussed in U.S. Pat. No. 6,987,481, said document hereby incorporated by reference.

The components and circuitry on the PCB can e.g. be realized by means of strip conductor technology, such as microstrip leads, so that no additional component costs arise with respect to these circuit components.

With the coupling circuit 130 according to this embodiment, the output signal can be provided on the feeding probes 121 and 122, having opposed phase, and the reflected signal is received on the intermediate feeding probe 123. Since the transmitting feeding probes 121 and 122 are symmetrically arranged around the receiving feeding probe 123, the leakage to the receiving feeding probe can be significantly reduced, and thus bandwidth and match can be optimized with minor regard to leakage, which constitutes a significant improvement compared to prior art solutions. Further, as long as the probes and coupling circuits are located on the same PCB the additional manufacturing cost for extra probes is small.

Figure 3:
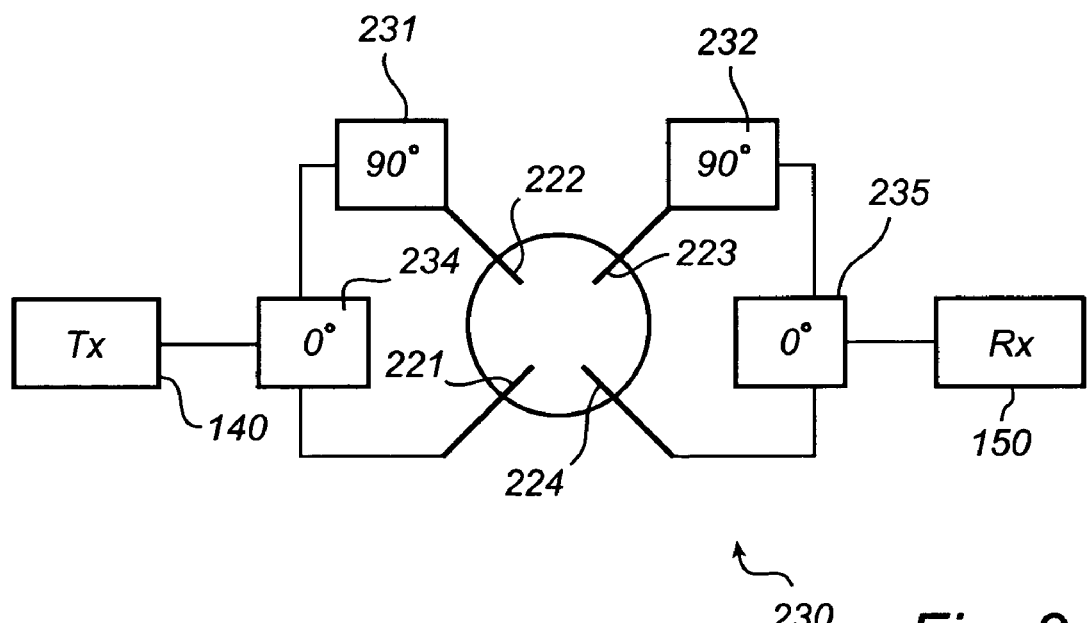
FIG. 3 is a schematic diagram of a second embodiment of a microwave circuit arrangement to be used in the radar level gauge system of FIG. 1.

Referring to FIG. 3, a second embodiment will now be discussed. This embodiment essentially corresponds to the above-discussed first embodiment, but with a different coupling circuitry, as will be discussed in the following.

In this embodiment, four feeding probes 221-224 are provided in the waveguide, two of which are used for transmission and two for reception. The feeding probes 221, 222 used for transmission are radially displaced with about 90 degrees, and similarly the feeding probes 223, 224 used for transmission are radially displaced with about 90 degrees. Further, all the feeding probes are essentially symmetrically arranged at the same distance from each other, so that all feeding probes are essentially separated with 90 degrees from each neighboring feeding probe.

Further, the coupling circuit 230 according to the second embodiment comprises a 0 degree couplers 234, 235 connected to the output of the TX 140 and the input of the RX 150, respectively. The 0 degree couplers are commonly known as dividers, and e.g. 0 degree Wilkinson power dividers may be used. The divider 234 connected to the TX 140 is connected to the transmitting feeding probes 231, 232. However, one of the divided signal parts is provided through a 90 degree phase delay 231 so that the signals provided to the transmitting feeding probes are correspondingly phase separated. The 90 degree phase delay may e.g. be realized by means of a 90 degree coupler, as discussed in the foregoing. However, preferably the 90 degree phase delay is realized with 90 degrees Schiffman phase shifters, giving a more wide-band phase-shift. Similarly, the divider 235 connected to the RX 150 receives signals from the receiving feeding probes 233, 234. However, one of the received signal parts is provided through a 90 degree phase delay 232 so that the signals provided to the receiving feeding probes are correspondingly phase separated.

With the coupling circuit 230 according to this embodiment, the output signal can be provided on the feeding probes 221 and 222, having differentiated phase, and phase differentiated reflected signal are correspondingly received on the receiving feeding probes 223, 224. In this embodiment there will still be a loss in the Wilkinson power divider which may be 3 dB in each direction. However, due to the symmetry of the feeding probes, the leakage to the receiving feeding probes can be significantly reduced, and thus bandwidth and match can be optimized with minor regard to leakage, which constitutes a significant improvement compared to prior art solutions. Further, as long as the probes and coupling circuits are located on the same PCB the additional manufacturing cost for extra probes is small.

Figure 4:
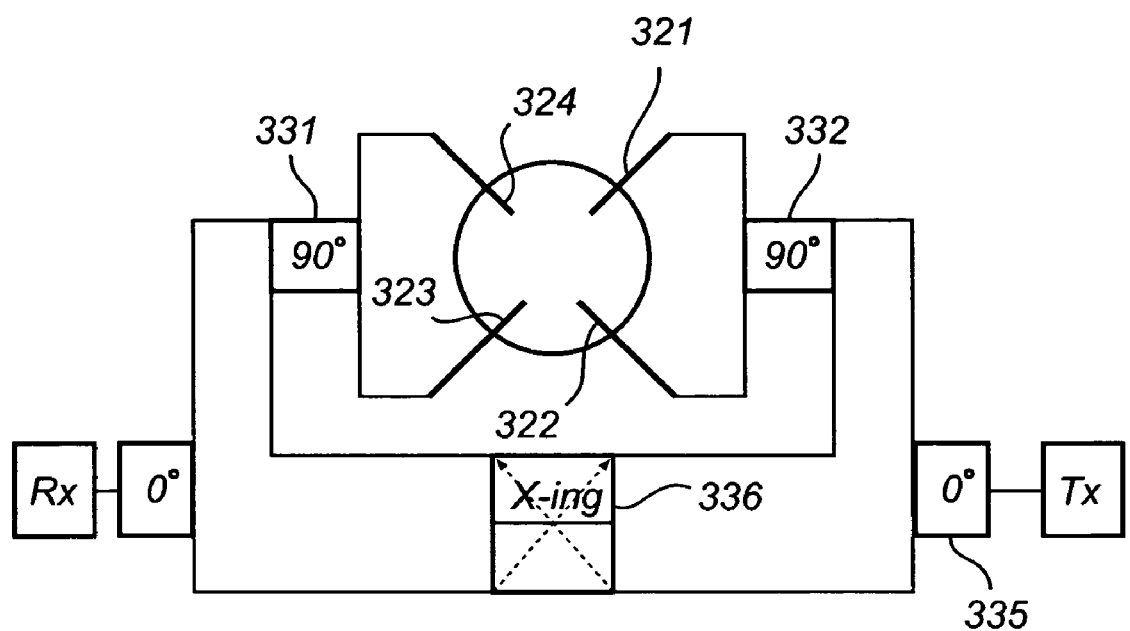
FIG. 4 is a schematic diagram of a third embodiment of a microwave circuit arrangement to be used in the radar level gauge system of FIG. 1.

Referring to FIG. 4, a third embodiment will now be discussed. This embodiment essentially corresponds to the above-discussed first and second embodiments, but with a different coupling circuitry, as will be discussed in the following.

In this embodiment, four feeding probes 321-324 are provided in the waveguide. All the feeding probes are essentially symmetrically arranged at the same distance from each other, so that all feeding probes are essentially separated with 90 degrees from each neighboring feeding probe.

Further, the coupling circuit 330 according to the third embodiment comprises a 0 degree couplers 334, 335 connected to the output of the TX 140 and the input of the RX 150, respectively. For example, 0 degree Wilkinson power dividers may be used. The dividers 334, 335 are each connected to a 90 degree coupler 331, 332. The 90 degree phase delay may e.g. be realized by means of a 90 degree coupler, as discussed in the foregoing. The 90 degree couplers are each connected to two feeding probes 321, 322 and 323, 324, respectively, in order to provide phase differentiated signals to/from said feeding probes. Further, the dividers 334, 335 are each connected to a common crossing 336 (marked X-ing), which may e.g. be realized by means of two by two 90 degrees hybrid couplers or by a more conventional line crossing. The crossing 336 is further connected to each of the 90 degree couplers 331 and 332. With this type of crossing it is still possible to keep the pattern on the PCB within one single layer, whereby an inexpensive manufacturing is rendered possible.

With the coupling circuit 330 according to this embodiment, a similar operation and similar advantages as discussed above in relation to the other embodiments are achieved.

However, in case crossings in different layers on the PCB are acceptable, a solution similar to the one discussed in relation to FIG. 4 are feasible. For example, one such solution is illustrated in FIG. 5.

In this embodiment, four feeding probes 421-424 are provided in the waveguide. All the feeding probes are essentially symmetrically arranged at the same distance from each other, so that all feeding probes are essentially separated with 90 degrees from each neighboring feeding probe.

Figure 5:
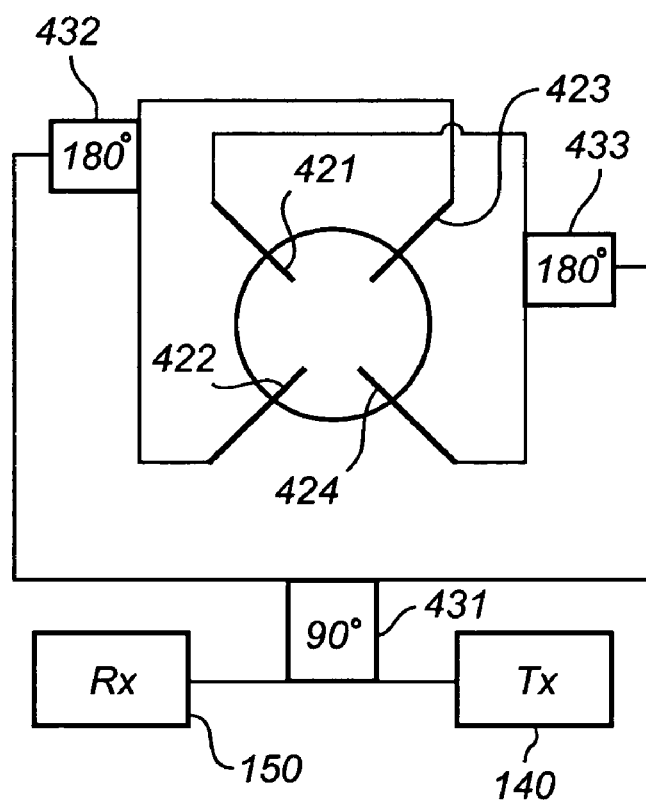
FIG. 5 is a schematic diagram of a fourth embodiment of a microwave circuit arrangement to be used in the radar level gauge system of FIG. 1.

Further in this embodiment of FIG. 5, the TX 140 and the RX 150 are both connected to a 90 degree coupler 431. Further, the 90 degree coupler is connected to two 180 degree couplers 432, 433. Each 180 degree is coupled to two of the feeding probes 421, 424 and 422, 423, respectively. However, in this embodiment, another crossing is necessary to reach the feeding probes. Various methods for crossings are possible, as is per se well known in the art. For example, one of the conducting lines may traverse through the PCB, in order to be arranged on the other side of the PCB at the crossing. Alternatively, the conducting lines may be arranged as overlaying lines at the same side, and being separated by an insulation layer or the like at the crossing.

The four implementations in FIGS. 2-5 are all examples of the principle where three or four probes in the waveguide enables the use of mechanical symmetry to improve the bandwidth and performance of the circuits. Of these examples, FIGS. 4-5 have a similar function but with the order of the 180° and 90° hybrids interchanged, depending on which type of circuit technique that is used. Both FIGS. 4 and 5 give good insulation of RHCP/LHCP and good suppression of the unwanted $E_{01}$ mode. FIG. 3 is a simpler topology using four probes, but with certain loss in the power dividers, and FIG. 2 has less $E_{01}$-suppression by the simpler three-probe geometry used therein. However, other arrangements of the microwave hybrid couplers to feed three or more waveguide probes are possible.

In all schematic embodiments discussed above, the line lengths are not perfectly to scale, and for real implementation it will be appreciated by those versed in the art that it is of importance for the bandwidth to optimize the line-lengths to get the right phase shift over a sufficiently wide band.

It is to be appreciated by those versed in the art that several alternative circuitries and components may be used to realize the above-discussed different embodiments of the present invention. For example, several passive microwave structures are known as couplers under various names. On a PCB they may be made of a printed pattern, possibly with one or more resistive elements. Preferably they are linear, i.e. signals can be added, and reciprocal, i.e. identical function is achieved in both directions. "Coupler" or "hybrid" are two comprehensive names and many times a typical phase shift is used as an additional description. "0° hybrid", "90° hybrid" and "180° hybrid" are well known functional concepts but various realizations are used with different properties. In many cases the power is divided in two nominally equal parts ("3 dB hybrid" etc.) but couplers with less coupling are also common. In the present invention, 3 dB couplers are preferred, and in case a smaller coupling is used (−10 dB and −20 dB are common in test equipment) the phase generally is less important. Very often there are four inputs/outputs to the coupler and one typical function is that two inputs have little mutual coupling while the two other present sum and difference between the two input signals. Another classification is the type of transmission lines (waveguides) which are used (microstrip etc. on a PCB, coaxial line and hollow waveguides).

The phase shift of the coupler can be done by an extra line length as well (90° at 10 GHz is around 5 mm on the PCB) but the frequency variation may be a bit more with a delay line. Exemplary delay lines are Schiffman phase shifter (looks like a narrow U $\lambda/4$ long) which are less frequency sensitive.

Three ports with 3 dB coupling are power-dividers (0°) and baluns (180°). The Wilkinson power divider is most common and looks like a narrow U with a resistor between the two upper ends where the outputs are connected and feeding is at the lowest point. Several baluns exists and are typically used to fed an anti-symmetric structure (say a dipole fed from its centre) from a coaxial line (balun is short for "balanced to unbalanced").

"Branch-line coupler" is a class of couplers with a geometry like a ladder with 4 $\lambda/4$ members with a suitable width as the simplest one. The very common 90°-hybrid gives two outputs with 90° phase difference and the fourth output isolated. If one of the $\lambda/4$-pieces is replaced by one single 3 $\lambda/4$ a so-caller "rat-race" hybrid is achieved, providing 0° and 180° phase difference. More members are employable to improve bandwidth.

Coupled transmission line couplers can be realized with two lines close to each other over $\lambda/4$. The coupling will be in different order and this one is less suited as power divider but more suitable for a weaker coupling. The Lange coupler is one example where the two parallel wires are replaced by 4 interleaving ones which are very wideband.

Specific embodiments of the invention have now been described. However, several alternatives are possible, as would be apparent for someone skilled in the art. For example, many different components and circuits are useable for the 0, 90 and 180 degree couplers, dividers and delays, and accordingly the principles behind the above-discussed schematic embodiments of the coupling circuits are all realizable in a multitude of different ways.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

What is claimed is:

1. A radar level gauge for determining a filling level of a filling material contained in a container by transmitting and receiving elliptically polarized waves, comprising:
    a feeding circuitry for feeding and receiving two essentially orthogonal elliptically polarized waveguide modes, one of said modes for transmission and another mode for reception;
    an antenna for transmitting said waveguide modes towards said filling material and for receiving signals reflected from said filling material;
    a waveguide to provide signals between said feeding circuitry and said antenna;
    wherein said feeding circuitry comprises:
        a microwave generating unit,
        a microwave receiving unit;
        at least three feeding probes at least partly protruding into said waveguide for transmitting and receiving said two essentially orthogonal elliptically polarized waveguide modes; and
        a coupling circuitry for transferring and feeding signals between each feeding probe and the microwave generating unit and/or the microwave receiving unit.

2. The radar level gauge of claim 1, wherein at least the coupling circuitry and the feeding probes are implemented on a common printed circuit board, said printed circuit board being arranged transversely across said waveguide.

3. The radar level gauge of claim 2, wherein the microwave generating unit and the microwave receiving unit are also implemented on the common printed circuit board.

4. The radar level gauge of claim 2, wherein the printed circuit board is arranged essentially perpendicular to said waveguide.

5. The radar level gauge of claim 1, wherein the feeding circuitry comprises three probes, two of which are geometrically separated by about 180 degrees, and the third being arranged essentially symmetrically there between.

6. The radar level gauge of claim 5, wherein the coupling circuitry is arranged to feed transmitting signals at an operating frequency to the two probes geometrically separated by about 180 degrees in anti-phase, and to receive reflected signals from the intermediate third feeding probe.

7. The radar level gauge of claim 5, wherein the coupling circuitry comprises a 180 degree coupler being connected to the two probes which are separated by about 180 degrees, and a 90 degree coupler having four terminals, said terminals being connected to the 180 degree coupler, the third feeding probe, the microwave generating unit and the microwave receiving unit.

8. The radar level gauge of claim 1, wherein the feeding circuitry comprises at least four probes, said probes being essentially symmetrically arranged around the waveguide.

9. The radar level gauge of claim 8, wherein the coupling circuit is arranged to feed the feeding probes to be used for transmission in progressive phase around the waveguide in clockwise and/or counter-clockwise order.

10. The radar level gauge of claim 9, wherein at least two of the feeding probes are usable for transmission and at least two feeding probes are usable for reception, wherein the feeding probes usable for transmission are symmetrically distributed around the waveguide, and the feeding probes usable for reception are arranged intermediately between said feeding probes usable for transmission.

11. The radar level gauge of claim 8, wherein at least two of the feeding probes are usable for transmission and at least two feeding probes are usable for reception, wherein the feeding probes usable for transmission are arranged adjacent to each other at one part of the waveguide and the feeding probes usable for reception are arranged adjacent to each other at another part of waveguide.

12. The radar level gauge of claim 1, wherein the parts of the feeding probes protruding into the waveguide comprises essentially straight conducting elements.

13. The radar level gauge of claim 12, wherein the essentially straight conducting elements are directed towards the center of said waveguide.

14. A method for determining a filling level of a filling material contained in a container by transmitting and receiving elliptically polarized waves, comprising the steps:

providing at least three feeding probes which at least partly protrude into a waveguide;

operating said feeding probes to transmit a first elliptically polarized waveguide mode towards the filling material; and operating said feeding probes to receive a second elliptically polarized waveguide mode after reflection by said filling material, wherein said second elliptically polarized waveguide mode is essentially orthogonal to said first elliptically polarized waveguide mode.

15. The method of claim 14, wherein the feeding probes are operated to feed transmitting signals at an operating frequency to two probes geometrically separated by about 180 degrees in anti-phase, and to receive reflected signals from an intermediate third feeding probe.

16. The method of claim 14, wherein the feeding probes are operated for transmission in progressive phase around the waveguide in clockwise and/or counter-clockwise order.

* * * * *